US012650296B2

(12) United States Patent
Eversole

(10) Patent No.: US 12,650,296 B2
(45) Date of Patent: Jun. 9, 2026

(54) METHOD FOR MEASURING WIDTH AND EDGE PROFILE OF A SINGLE BOARD IN A STACK OF MULTIPLE BOARDS

(71) Applicant: KNAUF GIPS KG, Iphofen (DE)

(72) Inventor: Leslie Eversole, Milton, PA (US)

(73) Assignee: KNAUF GIPS KG, Iphofen (DE)

( * ) Notice: Subject to any disclaimer, the term of this patent is extended or adjusted under 35 U.S.C. 154(b) by 230 days.

(21) Appl. No.: 18/136,505

(22) Filed: Apr. 19, 2023

(65) Prior Publication Data

US 2024/0102790 A1 Mar. 28, 2024

Related U.S. Application Data

(60) Provisional application No. 63/410,343, filed on Sep. 27, 2022.

(51) Int. Cl.
*G01B 11/04* (2006.01)
*B28B 19/00* (2006.01)

(52) U.S. Cl.
CPC ........ *G01B 11/046* (2013.01); *B28B 19/0092* (2013.01)

(58) Field of Classification Search
CPC ..... G01B 11/046; G01B 11/024; G01B 11/04; G01B 11/105; G01B 21/06; B28B 17/0081; B28B 17/0072; B28B 19/0092; B28B 15/00; B28B 11/243; B28B 17/0063
USPC ...................................... 156/39, 45, 64, 378
See application file for complete search history.

(56) References Cited

U.S. PATENT DOCUMENTS

| | | | |
|---|---|---|---|
| 2,078,199 A | 4/1937 | King | |
| 3,573,947 A | 4/1971 | Kinkade et al. | |
| 5,643,510 A | 7/1997 | Sucech | |
| 5,683,635 A | 11/1997 | Sucech et al. | |
| 5,798,425 A | 8/1998 | Albrecht et al. | |
| 6,409,825 B1 | 6/2002 | Yu et al. | |
| 6,777,517 B1 | 8/2004 | Albrecht et al. | |
| 6,874,930 B2 | 4/2005 | Wittbold et al. | |
| 6,986,812 B2 | 1/2006 | Dubey et al. | |
| 7,767,019 B2 | 8/2010 | Liu et al. | |
| 7,803,226 B2 | 9/2010 | Wang et al. | |
| 7,892,472 B2 | 2/2011 | Veeramasuneni et al. | |
| 8,931,230 B2 | 1/2015 | Negri et al. | |
| 9,745,222 B2 | 8/2017 | Eversole et al. | |

(Continued)

FOREIGN PATENT DOCUMENTS

| | | |
|---|---|---|
| CN | 111811627 A | 10/2020 |
| WO | WO2000/012963 | 3/2000 |

OTHER PUBLICATIONS

Limab "GMS1100—Gypsum board dimensional measurement" from archive.org Sep. 28, 2020 pp. 1-6.*

(Continued)

*Primary Examiner* — John L Goff, II
(74) *Attorney, Agent, or Firm* — Pradip Sahu; Greer, Burns & Crain, Ltd

(57) ABSTRACT

This disclosure provides systems and methods for continuous wallboard manufacturing, and in particular methods that include measuring a wallboard width and edge profiles in a post-kiln stack of at least two wallboards or more with a laser scanner, preferably a two-dimensional (2D) laser scanner positioned at a distance from a post-kiln conveyor and performing a laser scan of the stack passing by on the post-kiln conveyor.

7 Claims, 6 Drawing Sheets

(56) References Cited

U.S. PATENT DOCUMENTS

| | | | |
|---|---|---|---|
| 10,620,052 B2 | 4/2020 | Lash et al. | |
| 2015/0268183 A1* | 9/2015 | Yonezawa | G01N 33/38 |
| | | | 374/57 |
| 2017/0022104 A1 | 1/2017 | Eversole | |
| 2017/0045399 A1* | 2/2017 | Lash | G06T 7/0008 |
| 2018/0224364 A1* | 8/2018 | Eversole | B28B 17/0072 |
| 2021/0138686 A1* | 5/2021 | Yasue | G01B 11/00 |

OTHER PUBLICATIONS

Hippler HP., "Dimensionsmessung Bei Der Gipsplatten-Herstellung Durch Laser-Messtechnik", ZKG International, Jun. 1, 1990, pp. 306-309, vol. 43, No. 6.
PCT Search and Written Opinion dated Jan. 3, 2024 for PCT Application No. PCT/US2023/074864 (Authorized Officer: Konen, Tuija).

* cited by examiner

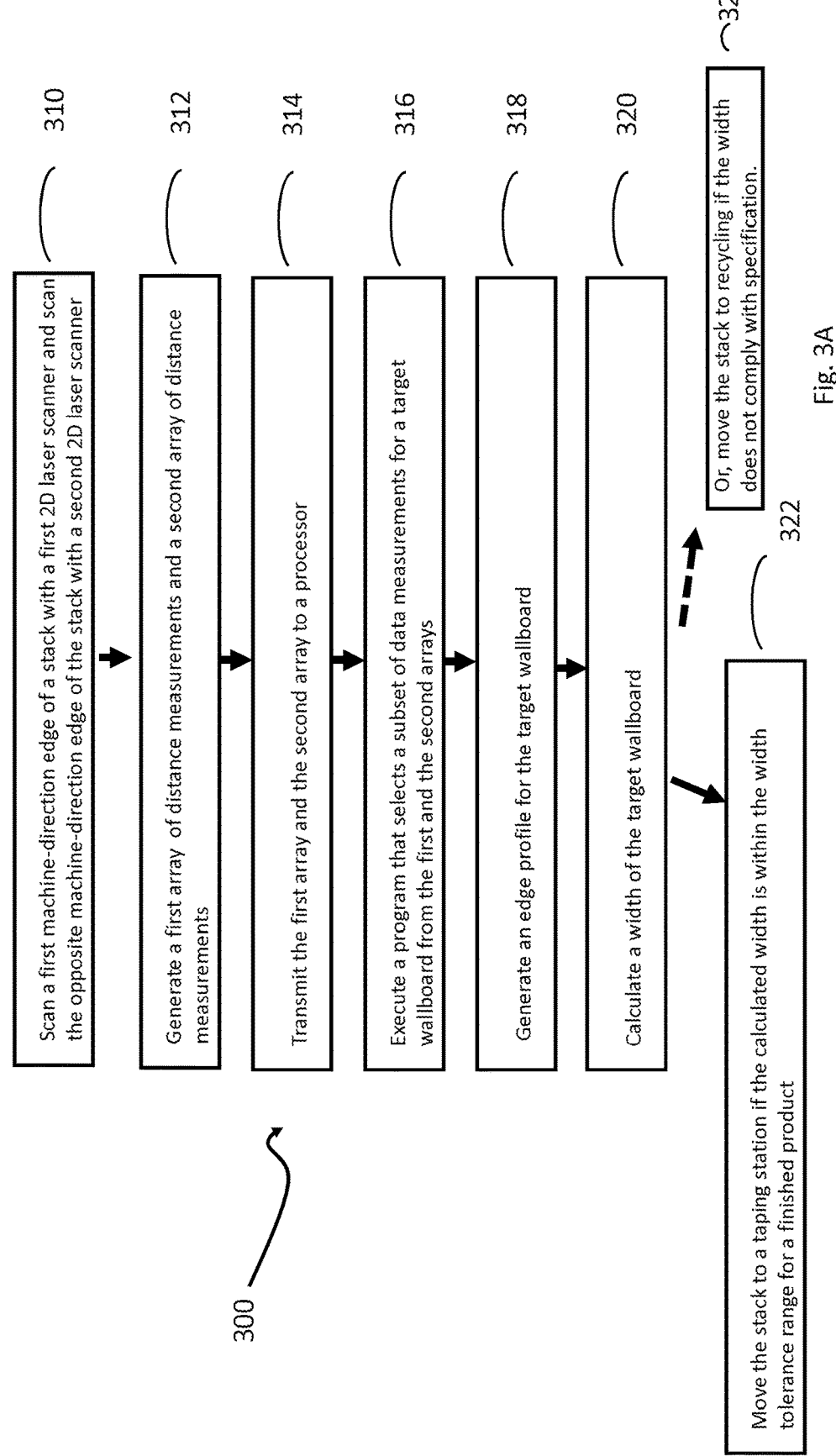

300

Scan a first machine-direction edge of a stack with a first 2D laser scanner and scan the opposite machine-direction edge of the stack with a second 2D laser scanner — 310

Generate a first array of distance measurements and a second array of distance measurements — 312

Transmit the first array and the second array to a processor — 314

Execute a program that selects a subset of data measurements for a target wallboard from the first and the second arrays — 316

Generate an edge profile for the target wallboard — 318

Calculate a width of the target wallboard — 320

Move the stack to a taping station if the calculated width is within the width tolerance range for a finished product — 322

Or, move the stack to recycling if the width does not comply with specification. — 324

Fig. 3A

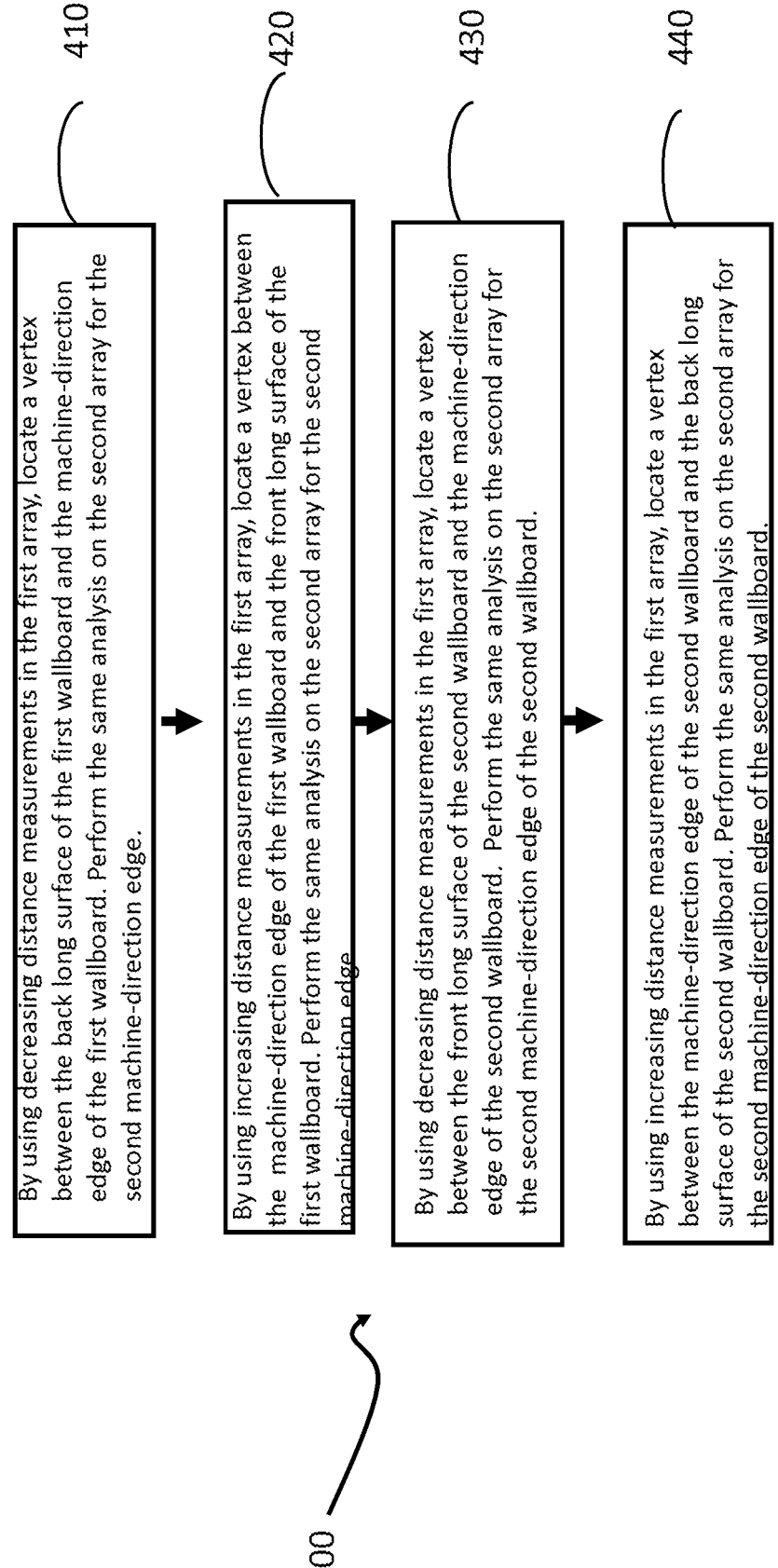

410

By using decreasing distance measurements in the first array, locate a vertex between the back long surface of the first wallboard and the machine-direction edge of the first wallboard. Perform the same analysis on the second array for the second machine-direction edge.

420

By using increasing distance measurements in the first array, locate a vertex between the machine-direction edge of the first wallboard and the front long surface of the first wallboard. Perform the same analysis on the second array for the second machine-direction edge.

430

By using decreasing distance measurements in the first array, locate a vertex between the front long surface of the second wallboard and the machine-direction edge of the second wallboard. Perform the same analysis on the second array for the second machine-direction edge of the second wallboard.

440

By using increasing distance measurements in the first array, locate a vertex between the machine-direction edge of the second wallboard and the back long surface of the second wallboard. Perform the same analysis on the second array for the second machine-direction edge of the second wallboard.

METHOD FOR MEASURING WIDTH AND EDGE PROFILE OF A SINGLE BOARD IN A STACK OF MULTIPLE BOARDS

CROSS-REFERENCE TO RELATED APPLICATIONS

This application claims the benefit of priority to U.S. Provisional Patent Application 63/410,343 filed Sep. 27, 2022, the entire disclosure of which is herein incorporated by reference in its entirety.

TECHNICAL FIELD

This disclosure relates to systems and methods for continuous wallboard manufacturing and in particular to systems and methods for measuring the wallboard width and edge profiles in a stack of multiple wallboards.

BACKGROUND

Wallboards are commonly used in construction, including for building interior walls and ceilings. A wallboard may be manufactured by mixing a gypsum slurry and distributing the gypsum slurry between two paper cover sheets for example, as described in U.S. Pat. No. 9,745,222, the entry disclosure of which is herein incorporated by reference.

During production on a wallboard production line, a first sheet of paper, called the facer is fed from a roll onto a conveyer belt. A gypsum slurry is distributed from a mixer onto the facer. A second sheet of paper, called the backer, is fed from a roll and is used to overlay and cover the gypsum slurry forming a continuous ribbon. This sandwiched continuous ribbon of wallboard precursor may be moving on the conveyer belt until gypsum is set sufficiently for the ribbon to be cut into individual wallboards which are then transferred into a drying oven (kiln). When a gypsum slurry is distributed on the facer, it should be distributed as evenly as possible between the central portion of the facer and its edges. A width of wallboard should be also either constant or have only negligently minor deviations from the preset value. Many factors may affect the quality of gypsum slurry distribution, including such as a temperature at which a production line operates, a composition of the gypsum slurry, a source of water and of other ingredients in the gypsum slurry, paper used as a facer, paper used as a backer, and/or humidity.

Various methods are known in the art for monitoring and measuring the width of the gypsum wallboard and edge profiles while a ribbon precursor is moving on the conveyor. For example, U.S. Pat. No. 9,745,222 describes a method in which at least one laser scanner and processor are installed at the wallboard production line, monitoring the width and edge profiles of a gypsum wallboard in real time during manufacturing. PCT publication WO 2000/012963 describes a method and system for detecting the edge angle of a gypsum board. The system comprises a light source and camera and requires pictures to be taken for obtaining information about slurry distribution in a gypsum board.

After wallboard panels are dried in a kiln, they are stacked facer-to-facer into a stack which may contain 2, 4, 5 or more wallboards. Currently, there is a need in the field for systems and methods that can accurately measure a single dry wallboard width and edge profiles in a stack of multiple post-kiln wallboards.

SUMMARY

This disclosure addresses at least some of these needs and provides methods and systems for measuring the width and edge profile of a single wallboard in a post-kiln stack of multiple wallboards.

In one aspect this disclosure provides a method comprising:
- i) scanning with a laser beam of a first 2D laser scanner at least a first portion of a cross-machine surface of a stack arranged from at least two wallboards, a first wallboard having a first front long surface and a second wallboard having a second front long surface, wherein the second front long surface of the second wallboard is placed over the first front long surface of the first wallboard in the stack, and
  - where the first portion of stack includes a first machine-direction edge of the stack, and generating with a sensor of the first 2D laser scanner a first array of distance measurements from the first 2D laser scanner to the scanned first portion, wherein each measurement in the first array of distance measurements has a horizontal coordinate (x) and a vertical coordinate (y);
- ii) scanning with a laser beam of a second 2D laser scanner at least a second portion of the cross-machine surface of the stack, where the second portion includes the opposite-to-the-first machine-direction edge of the stack, and generating with a sensor of the second 2D laser scanner a second array of distance measurements from the second 2D laser scanner to the scanned second portion, wherein each measurement in the second array has a horizontal coordinate (x) and a vertical coordinate (y);
- iii) transmitting the first array of distance measurements and the second array of distance measurements to a processor;
- iv) executing with the processor a computer program and selecting from the first array and the second array a subset of distance measurements for the second wallboard, wherein the second wallboard is a target wallboard;
- v) generating an edge profile for the target wallboard from the subset of distance measurements;
- vi) calculating a width value of the target wallboard and classifying the stack as width-value compliant if the width value of the target wallboard is withing a width tolerance range, or as width-value non-compliant if the width value of the target wallboard is not within the width tolerance range; and
- vii) moving the stack to a taping station if the stack is classified as width-value compliant or moving the stack for recycling if the stack is not width-value compliant.

Preferred embodiments of the method include those, wherein the width tolerance range is defined as a specification nominal value plus 0 or minus $3/32$ inch (−2.4 mm). In the methods, the stack may contain 2, 3, 4, 5, or 6 wallboards. In some preferred embodiments, the wallboards in the stack may have straight or tapered machine-direction edges. Some preferred embodiments of the method include those, wherein step iv) includes one or more following:
- a) executing with the processor a computer program, analyzing the first array and locating in the first array a horizontal coordinate and a vertical coordinate for a vertex between the back long surface of the first wallboard and the machine-direction edge of the first wallboard, preferably by using the decreasing distance measurements in the array;

b) locating a horizontal coordinate and a vertical coordinate for a vertex between the machine-direction edge of the first wallboard and the front long surface of the first wallboard, preferably by using the increasing distance measurements in the array;

c) locating a horizontal coordinate and a vertical coordinate for a vertex between the front long surface of the second wallboard and the machine-direction edge of the second wallboard, preferably by using the decreasing distance measurements in the array, and marking these coordinates as a first bottom vertex of the target wallboard;

d) locating a horizontal coordinate and a vertical coordinate for a vertex between the back long surface of the second wallboard and the machine-direction edge of the second wallboard, preferably by using the increased distance measurements in the array, and marking these coordinates as a first top vertex of the target wallboard;

e) repeating steps a) through d) on the second array and marking coordinates for a second bottom vertex and a second top vertex of the target wallboard; and f) using a subset of distance measurements between the two bottom vertexes and the two top vertexes in steps v) and vi) for generating the edge profile and calculating the width value.

In some embodiments, the first 2D laser and the second 2D laser may be the same, but having the capability to generate two laser beams at the same time.

In any of these embodiments, the method may further comprise displaying on a display device the edge profile generated in step v).

In some embodiments, the method may further comprise sending a signal from the processor to a controller when the stack is classified as width-value non-compliant.

Some embodiments of the method may be performed with the stack being positioned on a post-kiln conveyor with a back long surface of the first wallboard being placed on a surface of the post-kiln conveyor.

In another aspect, this disclosure relates to a system for manufacturing a wallboard, the system comprising:

a wallboard manufacturing line, one or more kilns configured for receiving wallboards from the wallboard manufacturing line, a post-kiln conveyor configured for receiving from the one or more kilns a stack of two or more wallboards, the post-kiln conveyor further configured for moving the stack along the length of the post-kiln conveyor, and one or more 2D laser scanners positioned at a location which is at a distance from the post-kiln conveyor, the one or more 2D laser scanners having a view from the location of a cross-machine surface of the stack situated at a place along the length of the post-kiln conveyor.

Embodiments of the system include those, wherein the system may further comprise a taping station configured for receiving the stack from the post-kiln conveyor. In some embodiments of the system, the one or more 2D laser scanners may be in operable arrangement with a processor in operable arrangement with a non-transitory, computer-readable medium that stores a computer program which when executed by the processor, selects a single target wallboard from the stack for calculations computes a width and edge profile of a single target wallboard in the stack.

The system further includes a controller in operable arrangement with the one or more 2D laser scanners. Preferably, one or more kilns may each have several shelves, and each shelf may be further configured for housing more than one wallboards.

In yet another aspect, this disclosure relates to a method for manufacturing a wallboard, the method comprising:

mixing a gypsum slurry from calcined gypsum, water and one or more additives;

depositing the gypsum slurry on a facer paper cover sheet continuously moving on a production line;

covering the gypsum slurry with a backer paper cover sheet;

forming a ribbon precursor of wallboard;

cutting the ribbon into wallboards;

transferring the wallboards to a kiln;

drying the wallboards in the kiln;

while removing the wallboards from the kiln, arranging the wallboards into stacks of two wallboards or more on a post-kiln conveyor; and moving the stacks on the post-kiln conveyor pass a location at which each stack is scanned with a 2D laser on its cross-machine surface and a first array of distance measurements for a first machine-direction edge of the stack is generated and a second array of distance measurements for a second machine direction edge is generated.

Some embodiments of the method may further comprise analyzing the first array and the second array for compliance with specification requirements for a finished product and wherein the analysis includes transmitting the arrays to a processor which executes a computer program which selects a target wallboard in the stack and computes a width and edge profile for the target wallboard. Preferably, the selecting the target wallboard may include finding in the arrays a horizontal coordinate and a vertical coordinate for each of the two bottom vertexes and finding a horizontal coordinate and a vertical coordinate for each of the two top vertexes of the target wallboard, and more preferably, wherein the finding of the bottom vertexes is performed by using the decreasing distance measurements and wherein the finding of the top vertexes is performed by using the increasing distance measurements.

BRIEF DESCRIPTION OF THE DRAWINGS

FIG. 3A is a flowchart illustrating one embodiment of a method for measuring the width and edge profile of a single wallboard in a post-kiln stack of multiple wallboards.

FIG. 3B is a flowchart illustrating one embodiment of a method for locating a target wallboard in a post-kiln stack of at least two wallboards.

DETAILED DESCRIPTION

In this disclosure, the term "calcined gypsum" may be used interchangeably with any of the following terms:

calcium sulfate hemihydrate, stucco, calcium sulfate semi-hydrate, calcium sulfate half-hydrate or plaster of Paris.

In this disclosure, the term "gypsum" may refer to any of the following: naturally mined gypsum (ore), landplaster and/or synthetic gypsum. The term "gypsum" may be used interchangeably with the term "calcium sulfate dihydrate." The "synthetic gypsum" can be also referred to as "chemical gypsum."

In this disclosure, the term "wallboard" means a gypsum panel having a gypsum matrix core sandwiched between two paper cover sheets. The term "wallboard" may be used interchangeable with any of the following terms: gypsum panel, gypsum wallboard, drywall, gypsum board or board.

In this disclosure, the term "about" means a range of plus/minus 5% of the stated value. For example, "about 100" means 100±5 and "about 200" means 200±10.

In this disclosure, the term "wt %" means percentage by weight.

When stucco ($CaSO_4 \cdot 1/2H_2O$) is mixed with water into a slurry, stucco hydrates and sets into a gypsum matrix. This setting reaction can be described by the following equation:

$$CaSO_4 \cdot 1/2H_2O + 3/2H_2O \rightarrow CaSO_4 \cdot 2H_2O$$

In this disclosure, "calcination" means a process by which gypsum ($CaSO_4 \cdot 2H_2O$) is dehydrated into calcined gypsum ($CaSO_4 \cdot 1/2H_2O$). The process includes heating gypsum to evaporate crystalline water. Calcined gypsum can be produced in different crystalline forms such as alpha calcium sulfate hemihydrate and beta calcium sulfate hemihydrate. All crystalline forms and any mixtures thereof are suitable for compositions according to this disclosure.

In this disclosure, various tests may be described. If no temperature, atmospheric pressure and/or humidity is mentioned in connection with a particular test, it means that the test was conducted at room temperature defined as 68 to 77° F. (20 to 25° C.), normal atmospheric pressure of about 101 kPa and a humidity in the range from about 68 to about 75 percent.

In this disclosure, ASTM tests refer to tests published by ASTM International, formally known as American Society for Testing and Materials. Detailed test protocols for ASTM tests are available from the ASTM International website.

In this disclosure, "a gypsum slurry" means a water-based gypsum slurry in which calcined gypsum is mixed with at least water, and preferably with one or more additives.

Figure 1A:
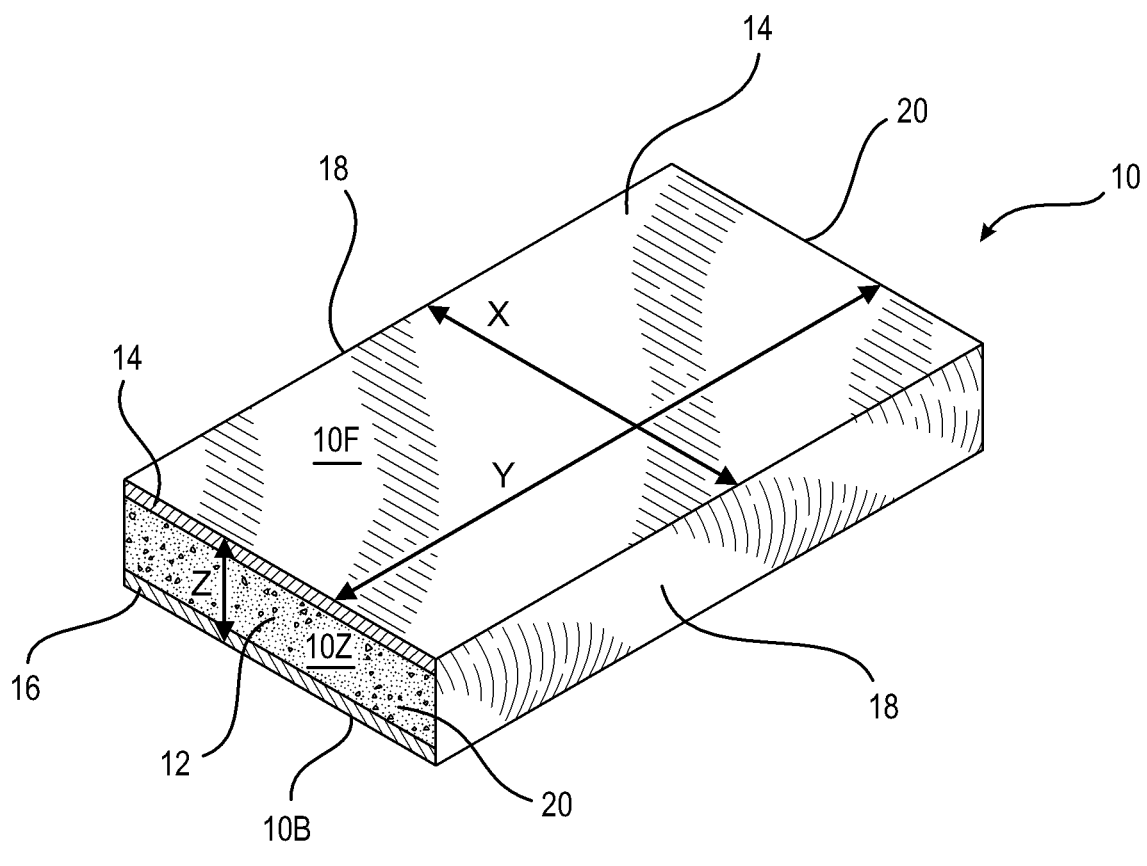
FIG. 1A is a perspective view of a wallboard with square machine-direction edges. This illustration is not drawn to scale.
Figure 1B:
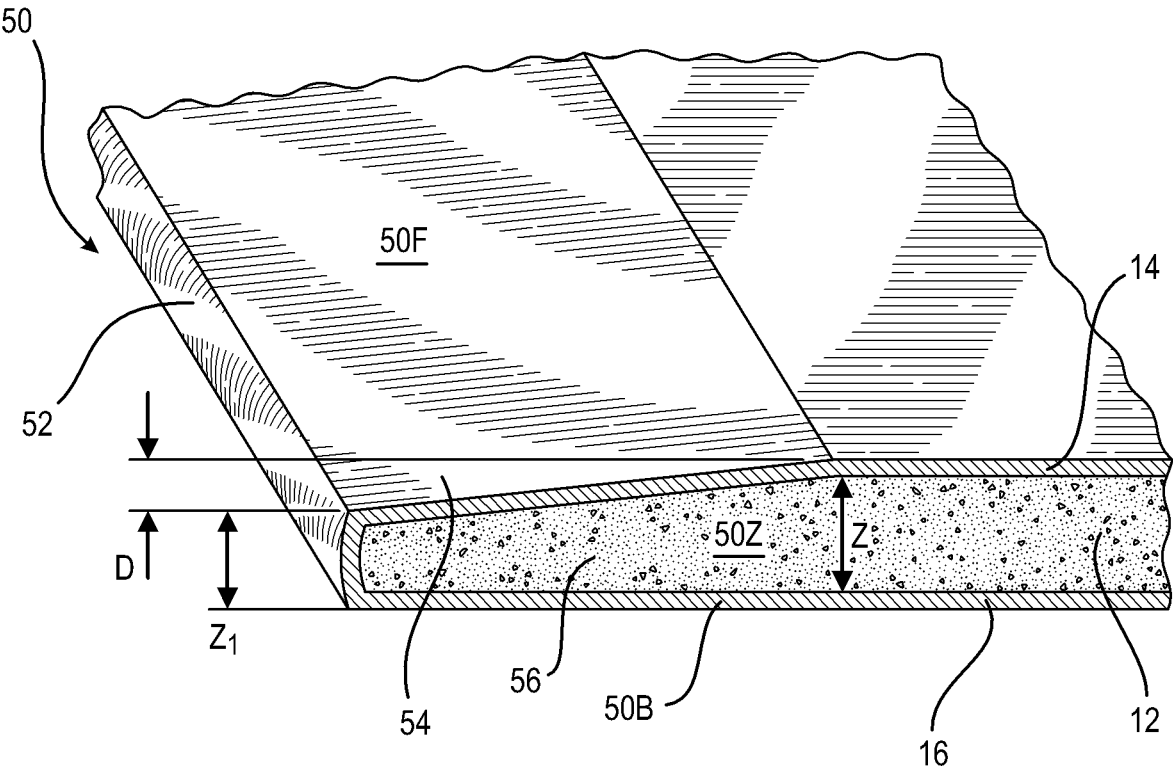
FIG. 1B is a perspective view of a wallboard fragment, focusing on and depicting one tapered machine-direction edge and its profile. This illustration is not drawn to scale.

This disclosure provides methods and systems for measuring a width and edge profiles for a single wallboard in a stack of several post-kiln wallboards. Referring to FIGS. 1A and 1B, two embodiments of a wallboard according to this disclosure are shown. The embodiment of FIG. 1A, generally (10) has square edges, while the embodiment of FIG. 1B, generally (50) has tapered edges. The wallboards (10 and 50) are composed of a set gypsum core (12) sandwiched between and adhered to two paper cover sheets, a face paper cover sheet which can be also referred to as a facer (14), and a back paper cover sheet which can be also referred to as a backer (16). In some embodiments, the gypsum core (12) is adhered to the paper cover sheets (14 and 16) directly. In some embodiments, at least one of the cover sheets (14 and 16) may contain an adhesive coating over at least a portion of the surface which is in contact with the gypsum core (12). In some embodiments, the gypsum core (12) may contain several layers, each layer formulated from a gypsum slurry that may differ in its formulation from gypsum slurries used in other layers. In some preferred embodiments, the gypsum core (12) may have a density of from about 30 pcf to 40 pcf. If a gypsum core (12) contains several layers, the layer in contact with the facer cover sheet (14) and/or the backer cover sheet (16) may have a density greater than a density of a central core layer. Paper cover sheets may comprise Manila paper, kraft paper and/or newsline paper. A multi-ply paper can be used, e.g., Manila heavy paper and MH Manila HT (high tensile) paper. A face paper cover sheet (14) and a back paper cover sheet (16) may be made from different paper grades and each of the cover sheets may be of different weight. Suitable paper weight ranges include, but are not limited to, the range from about 33 lbs/MSF to about 65 lbs/MSF. For example, a face cover sheet (14) may comprise manila paper of high density, preferably about 55 to about 65 lb/msf, but a paper cover sheet of different weight can be used as well. Newsline paper of lower density of about 35 to about 45 lbs/mfs can be used as back cover sheet (16). In some embodiments, one or both cover sheets (14 and 16) may have a coating, such as for example, as mold-resistant and/or water-resistant, on the cover sheet surface which is not attached to the gypsum core (12).

The gypsum core (12) contains a set gypsum preferably intermixed with various additives. The additives may include, but are not limited to, one or more of the following: starch, fibers, a dispersant, a foaming agent, a phosphate compound and/or agents that accelerate or delay a setting reaction in a gypsum slurry. Suitable phosphate compounds include cyclic polyphosphates, condensed phosphoric acids, and monobasic salts or monovalent ions of orthophosphates. Particularly preferred phosphate compounds include, but are not limited to, trimetaphosphate salts and tetrametaphosphate salts. Particularly preferred phosphate compounds include sodium trimetaphosphate ("STMP"), potassium trimetaphosphate, ammonium trimetaphosphate, sodium hexametaphosphate, tetrapotassium tripolyphosphate, ammonium polyphosphate, aluminum trimetaphosphate or any combination thereof. The gypsum slurries and gypsum cores of this disclosure may comprise from about 0% to about 1% of one or more phosphate compounds by weight of calcined gypsum, preferably from about 0.1% to about 1% of one or more phosphate compound by weight of calcined gypsum.

The gypsum cores and gypsum slurries according to this disclosure may comprise one or more dispersants. Suitable dispersants include naphthalensulfonates and derivatives, including sodium and/or calcium naphthalenesulfonate, polycarboxylate dispersants and in particular, polycarboxylic ethers, including those described in U.S. Pat. Nos. 5,798,425, 6,777,517 and 7,767,019. Some gypsum cores and gypsum slurries may also comprise one or more lignosulfonates. The gypsum slurries and gypsum cores of this disclosure may comprise from about 0.05% to about 2% of one or more dispersants by weight of calcined gypsum, preferably from about 0.1% to about 1% of one or more phosphate compound by weight of calcined gypsum.

The gypsum cores and gypsum slurries according to this disclosure may comprise one or more set retarding and/or accelerating agents. These are compounds that modify a rate at which a gypsum slurry sets. Preferred set accelerating agents include "CSA" which may contain about 95% of calcium sulfate dihydrate co-ground with 5% sugar and then heat processed, as was described in U.S. Pat. No. 3,573,947. Other suitable accelerators include potassium sulfate and "HRA" which comprises calcium sulfate dihydrate freshly ground with sugar at a ratio of about 5 to about 25 pounds of sugar per 100 pounds of calcium sulfate dihydrate, as described in U.S. Pat. No. 2,078,199. Other accelerators for controlling a setting reaction in a gypsum slurry include wet gypsum accelerator (WGA) as described in U.S. Pat. No.

6,409,825. Typically, a set accelerating agent can be used in any amount suitable for controlling the rate of a calcined gypsum hydration. Preferably, the gypsum slurry according to this disclosure may comprise from about 0.1% to about 4% of one or more accelerating agents (accelerators), e.g., HRA or CSA, by weight of calcined gypsum, and more preferably from about 0.5% to about 2% of one or more a set accelerating agent by weight of calcined gypsum.

Suitable set retarding agents delay a hydration reaction of calcined gypsum. Such set retarding agents may include, but are not limited to, commercially available protein retarder SUMA, diethylenetriamine pentaacetic acid (DTPA), tartaric acid, citric acid, maleic acid or salts thereof, including in particular sodium citrate and/or potassium bitartrate (cream of tartar), or any combination thereof. A set retarding agent can be used in a small amount, for example in an amount in the range from about 0.01% to about 1.5% by weight of calcined gypsum, preferably in an amount in the range from about 0.05% to about 0.5% by weight of calcined gypsum.

In some embodiments, wallboards may include those in which a gypsum core contains air voids and is formed from a gypsum slurry mixed with a foaming agent (surfactant or soap) supplied as foam from a foam generator, as was described, for example, in U.S. Pat. Nos. 5,643,510 and 5,683,635, the disclosures of which are incorporated by reference.

Various commercially available foaming agents can be used, including, but not limited to, foaming agents comprising sodium dodecyl sulfate, magnesium dodecyl sulfate, ammonium dodecyl sulfate, potassium dodecyl sulfate, sodium decyl sulfate, alkoxylated alkyl sulfate surfactants, sodium laureth sulfate, potassium laureth sulfate, magnesium laureth sulfate, ammonium laureth sulfate, or any mixtures thereof. In some embodiments, a foaming agent or any blend of foaming agents may be used in any suitable amount to produce a gypsum core with a desired density and strength. In some embodiments, from about 0.01% to about 0.5% of a foaming agent can be used by weight of calcined gypsum.

In some embodiments, the gypsum core (12) according to this disclosure may comprise one or more water-repellent agents, preferably siloxane. In these embodiments, a polymerizable siloxane, preferably as an emulsion with may comprise an emulsifying agent, may be added to a gypsum slurry. In order improve polymerization of siloxane, a catalyst can be also added to the gypsum slurry. Suitable siloxane formulations and catalysts such as magnesium oxide, Class C fly ash, dead-burned magnesium oxide as disclosed in U.S. Pat. Nos. 7,892,472 and 7,803,226, the entire disclosures of which are herein incorporated by reference. In some embodiments, a gypsum core (12) may comprise siloxane in an amount from about 0.3% to about 2% by weight of calcined gypsum.

The gypsum core (12) can be formed from a gypsum slurry in which calcined gypsum (stucco) hardens (sets) by reacting with water. Suitable calcined gypsum (stucco) can be obtained by calcining naturally occurring gypsum and/or synthetic gypsum. Suitable gypsum slurries include those in which a water-to-calcined gypsum ratio by weight (known as the water-to-stucco ratio, WSR) is in the range from 0.5 to 1.5, preferably from 0.5 to 1.3, more preferably from 0.7 to 1, and most preferably from 0.7 to 1.3, e.g., 0.7, 0.8, 0.9, 1, 1.1, 1.2 or 1.3. A gypsum slurry may comprise from about 40 wt % to about 70 wt % of calcined gypsum. Gypsum slurries may comprise various additives.

When walls or ceilings are assembled from the wallboards (10 and/or 50), each wallboard is typically attached to a stud, e.g., a wood stud, such that the back cover sheet (16) is facing toward the stud, while the face cover sheet (14) is on the opposite side. When the wallboard (10 and/or 50) is in use, the face cover sheet (14) is facing a room.

As described in U.S. Pat. No. 8,931,230, the entire disclosure of which is herein incorporated by reference, wallboard edges are generally identified as being in the machine direction or cross-machine direction, based on the wallboard orientation during its formation on a manufacturing conveyor which is continuously moving. Edges along the direction in which the conveyor (machine) is moving are normally the longer edges than the cross-machine edges. The machine-direction edges are usually wrapped with a paper cover sheet during wallboard manufacture in which a gypsum slurry is deposited on a moving paper cover sheet (e.g., on a conveyor) to initially form a long, continuous ribbon of wallboard precursor which is eventually cut into wallboards in the cross-machine direction. The wallboards are then transferred into a kiln for drying.

Wallboard (10) has machine-direction edges (18 and 18) as shown in FIG. 1A. Wallboard (10) also has two cross-machine edges (20 and 20). FIG. 1B shows a segment of machine-direction edge (52) and a segment of a cross-machine edge (56) for the wallboard (50). In this disclosure, the machine-direction edges may be referred to as "long edges." The machine-direction edges are in lateral spaced relationship to each other along a cross-machine direction. In this disclosure, the "cross-machine edges" may be referred to as "short edges."

The wallboard (10 or 50) has a width (X), a length (Y) and a thickness (Z). Preferably, a value of length (Y) is greater than a value of width (X) and accordingly, the wallboard (10 or 50) has two long surfaces with the area (X multiplied by Y): a first (front) long surface (10F or 50F) which is covered with the face paper cover sheet (14) and is facing the room when the wallboard (10 or 50) is in use and a second (back) long surface (10B or 50B) which is opposite to the first front long surface. The back long surface (10B or 50B) is covered with the back paper cover sheet (16) and is facing toward a stud when the wallboard (10 or 50) is in use. The wallboard (10 or 50) also has two cross-machine surfaces a first of which (10z or 50z) is shown in FIG. 1A or 1B, and its opposite second cross-machine surface which is not visible in the drawings. In this disclosure, the "front long surface" may be referred to as "the front surface." In this disclosure, the "back long surface" may be referred to as "the back surface."

In the embodiments of FIGS. 1A and 1B, cross-machine edges (20, 20 or 56) are substantially square. In the embodiment of FIG. 1A, the machine-direction edges (18 and 18) are also square, meaning that the thickness (Z) is substantially the same in the center and at the long edges of the wallboard (10). In the embodiment of FIG. 1B, both machine-direction edges are tapered, meaning that the wallboard (50) tapers on its front long surface (50F) from the wallboard thickness (Z) to a reduced thickness ($Z_1$), wherein ($Z_1$)<(Z), toward each of the two machine-direction edges (52). Thus, the front long surface (50F) has a recess (taper) (54) at each of the two machine-direction edges (52). A depth (D) of the recess (54) may vary. In some embodiments, the depth (D) of the recess (54) may be in the range from about 0.001 inch to about 0.08 inch, when measured at the lowest point of the taper slope. The length of the recess (taper) (54) (L) may vary, including some embodiments, wherein the length (L) may be in the range from about ¼ inch to about ⅔ inch.

Referring to FIG. 1B, the embodiment of the wallboard (50) has a tapered edge profile (contour, shape or outline) for its two cross-machine surfaces (50$z$), while the wallboard (10) has a straight edge profile for its cross-machine surfaces (10$z$) as shown in FIG. 1A. In this disclosure, the "cross-machine surface" may be also referred to as the "transverse surface" because this surface is perpendicular to the direction in which a forming wallboard ribbon precursor is moving on a production line. In yet further embodiments of a wallboard (which are not shown), a wallboard may have round or beveled machine-direction edges.

Wallboards may have thickness (Z) from about ¼ inch to about one inch, depending on their expected use and application. Wallboards may include those with a length (Y) in the range of 8 to 16 ft., e.g., 8 ft, 10 ft or 16 ft (2438-4877 mm), a width (X) of 4 ft. (1219 mm) or 54 in. (1372 mm). Any of these panels can have a thickness from about ¼ inch to about one inch, with some preferred embodiments having a thickness (Z) of ⅝ inch (15.9 mm). In embodiments, wherein the wallboard has tapered edges, its thickness ($Z_1$) in the tapered portion may be reduced down by about a value in the range from about 0.001 inch to about 0.08 inch.

Each wallboard must comply with a product specification value for width and edge profiles among other specification requirements. A width and edge profiles of a ribbon precursor are preferably monitored with a laser scanner while the ribbon precursor is still moving on a manufacturing line. After the ribbon is cut into wallboards, they are dried in a kiln. It has been discovered that high temperatures in the kiln and/or some other factors may affect the width and edge profiles of post-kiln wallboards, but measuring a width and edge profiles of each single post-kiln wallboard with a laser scanner may be cumbersome and time-consuming, especially because post-kiln wallboards are typically arranged into a stack of a least two wallboards or more.

In one aspect, this disclosure provides a method by which one wallboard in a stack of several post-kiln wallboards is analyzed for its width and edge profiles with a laser scanner before the stack may be packaged for shipment. One of the technical advantages of the present method is that a whole stack of wallboards may be analyzed for the width and edge profile compliance rather than each wallboard in each stack has to be analyzed individually. The disclosed herein methods may provide significant energy and time savings.

In some preferred embodiments, this disclosure relates to methods for manufacturing the wallboard (10 or 50) which includes a step of measuring a width (X) and edge profiles for a single wallboard in a stack of multiple post-kiln wallboards before the stack is packaged for shipment.

In the present methods, the stack may be at least 2 wallboards high. For example, the stack may include 2, 3, 4, 5, or 6 wallboards arranged such that a long surface of one wallboard is placed on top of a long surface of another wallboard in the stack. Wallboards in the stack may have straight, tapered, round or beveled machine-direction edges.

Figure 2:
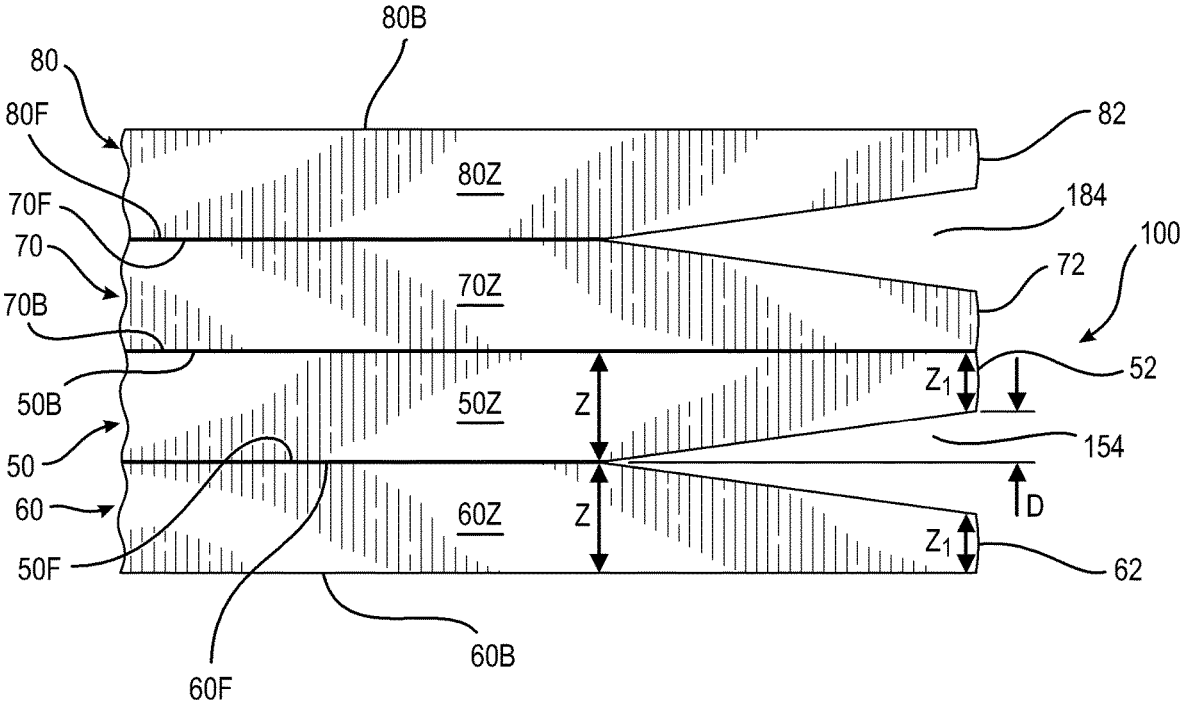
FIG. 2 depicts a cross-machine surface for a fragment of one embodiment of a post-kiln wallboard stack according to this disclosure.

In some embodiments, the stack may be arranged from wallboards that have straight machine-direction edges as was discussed in connection with the embodiment of FIG. 1A. In some embodiments of the stack, the wallboards may have tapered machine-direction edges as was discussed in connection with the embodiment of FIG. 1B. Referring to FIG. 2, it depicts a portion of a cross-machine surface for one embodiment of a post-kiln stack wallboards, generally (100), which may have four tapered wallboards, (50, 60, 70 and 80) arranged in the stack (100). In the stack (100), a first wallboard (60) has a front long surface (60F) and a back long surface (60B). A second wallboard (50) has a front surface (50F) and a back long surface (50B). The first wallboard (60) and the second wallboard (50) are aligned in the stack (100) with the front long surface (50F) of the second wallboard (50) being positioned over the front long surface (60F) of the first wallboard (60), such that the front long surface (50F) of the second wallboard (50) is covering the front long surface (60F) of the first wallboard (60). The back long surface (50B) of the second wallboard (50) in the stack (100) may be covered with the back long surface (70B) of the third wallboard (70), if the stack (100) includes the third wallboard (70), such that the second wallboard (50) and the third wallboard (70) are aligned with the back long surface (70B) of the wallboard (70) over the back long surface (50B) of the second wallboard (50). Because the first tapered wallboard (60) in the stack (100) and the second taped board (50) in the stack (100) are aligned front-surface-over-front-surface, the stack (100) has a gap (154) between the tapered edge portions (52) and (62) of the wallboards (50) and (60). However, as the second wallboard (50) and the third wallboard (70) are aligned with their back long surfaces (50B) and (70B) which do not have a taper, there is no appreciable gap in the stack (100) between the second (50) and third (70) wallboards in the stack (100). As to the third wallboard (70) and the fourth wallboard (80), they may be aligned with their front surfaces, producing a gap (184) between the tapered edge portions (72) and (82) of the wallboards (70) and (80).

A cross-machine surface in the stack (100) is composed of cross-machine surfaces (60$z$, 50$z$, 70$z$ and 80$z$) of the wallboards (60, 50, 70 and 80) assembled in the stack (100). A machine-direction edge in the stack (100) is composed of machine-direction edges (62, 52, 72 and 82) of the wallboards (60, 50, 70 and 80). In some preferred embodiments of the post-kiln stack according to this disclosure, it is important that the first (60) and second (50) wallboards are arranged in the stack (100) with the second front surface (50F) being positioned over the first front surface (60F) such that the recesses from the tapered edges (62 and 52) of the first wallboard and the second wallboard create the gap (154). Even in the embodiments with straight machine-direction edges, the stack (100) may still have the gap (154) in its long edge between the first and the second wallboards, wherein the gap (154) is detectable with a laser scanner.

If more than two wallboards are arranged in the stack (100), the third or other subsequent wallboard may be arranged in a back-surface-over-back-surface orientation, a front-surface-over-front surface orientation, or a back-surface-over-front-surface orientation.

With reference to FIG. 3A, certain embodiments of the methods according to this disclosure, generally (300), may comprise one or more steps listed in a flowchart of FIG. 3. The methods can be performed with a stack of at least two wallboards or more, and one preferred embodiment of the stacks includes the stack (100).

In step (310), at least a portion of a cross-machine surface of a stack of at least two wallboards according to this disclosure, the portion including a first machine-direction edge of the stack, is scanned with a laser beam from a light source of a first two-dimensional (2D) laser scanner located at a distance from the cross-machine surface of the stack. Preferably, two 2D laser scanners are used in step (310). A first 2D laser scanner scans a portion of the stack that includes at least a first machine-direction edge of the stack, while a second 2D laser scanner scans a portion of the stack that includes the opposite machine-direction edge of the stack. Preferably, the wallboards have tapered machine-direction edges (for example, wallboards 60 and 50). In the stack, a first wallboard (60) having a first front long surface (60F) and a second wallboard (50) having a second front long surface (50F) are arranged in the stack with the second long front surface (50F) being positioned over the first long front surface (60F).

In step (312), a sensor of the first 2D laser scanner captures light reflected from the illuminated cross-machine surface as an array of distance measurements, each measurement in the array having a horizontal coordinate and a vertical coordinate. A first 2D laser scanner generates a first array of distance coordinates for the first machine-direction edge of the stack, while a sensor of the second 2D laser scanner generates a second array of distance coordinates for the opposite long edge of the stack. Steps (310) and (312) can be performed simultaneously wherein a first array and a second array are generated in real time and while a first laser beam and a second laser beam are scanning the cross-machine surface of the stack.

In step (314), the sensor of the first 2D laser scanner transmits the first array of distance measurements for the first machine-direction edge to a processor, while the sensor of the second 2D laser scanner transmits the second array of distance measurements for the second machine-direction edge to the processor, wherein the processor is in operable arrangement with a non-transitory, computer-readable medium that stores a computer program which when executed, computes a width and edge profile of a single target wallboard in a stack of multiple wallboards, e.g., at least 2, 3, 4, 5, 6 or more.

In step (316), the processor executes the computer program which analyzes the first array of distance measurements and the second array of distance measurements and selects from the first array and from the second array only a subset of distance measurements for the second wallboard in the stack, the second wallboard being the target wallboard.

In step (318), the subset of distance measurements for the second wallboard is used to generate an edge profile for the target wallboard. The edge profile may be displayed on a computer monitor in operable arrangement with the processor. The edge profile of the target wallboard may be compared to a control edge profile.

In step (320), a width of the target wallboard is calculated from the subset of distance measurements and based on the know distance between the first 2D laser and the second 2D laser. The width of the target wallboard is compared to a width value (the nominal width) provided by a finished product specification. If the width of the target wallboard is within the width tolerance for the finished product, the stack containing the target wallboard is moved to a taping station in step (322), wherein the stack corners may be end-taped, and the stack may be packaged with other stacks for shipment to a user. Preferably, the width tolerance value may be defined as follows: the nominal width value plus 0 or minus $\frac{3}{32}$ inch (−2.4 mm).

However, if the width of the target wallboard is not within the tolerance value, e.g., the nominal value is larger than the width by more than $\frac{3}{32}$ inch, then instead of step (322), the stack containing the target wallboard is moved for re-cycling in step (324).

In order to locate the target wallboard (50) in the post-kiln stack (100), various methods can be used. Some preferred embodiments include methods in which a laser scanner is used for detecting the gap (154) at the cross-machine surface of the stack and locating the second wallboard in the stack (100) based on the location of the second wallboard relevant to the gap (154), e.g., the machine-direction edge of the second wallboard being positioned next to the gap (154).

A reference is made to FIG. 3B, which is a flowchart for one embodiment of a method, generally (400), which may be used for locating the target wallboard (50) in the stack (100). In step (410), the processor executes the computer program which analyzes the first array of distance measurements generated from the first laser scan of the first machine-direction edge of the stack and finds coordinates for a vertex between the back long surface of the first wallboard and the machine-direction edge of the first wallboard by using the decreasing distance measurements in the array.

In step (420), the computer program locates coordinates for a vertex between the machine-direction edge of the first wallboard and the front long surface of the first wallboard by using the increasing distance measurements in the array.

In step (430), the computer program locates a horizontal coordinate, x, and a vertical coordinate, y, for a vertex between the front long surface of the second wallboard and the machine-direction edge of the second wallboard by using the decreasing distance measurements in the array. These coordinates are marked as a first bottom vertex of the target wallboard.

In step (440), the computer program locates coordinates x and y for a vertex between the machine-direction edge of the second wallboard and the back long surface of the second wallboard by using the increasing distance measurements in the array. These coordinates are marked as a first top vertex of the target wallboard.

The same steps (410) trough (440) are performed with the second array obtained from laser scanning of the opposite machine-direction edge and coordinates for a second bottom vertex of the target wallboard and a second top vertex of the target wallboard are marked.

A subset of distance measurements between the bottom vertexes of the target wallboard and the top vertexes of the target wallboard can now be used in steps (318) and (320) for generating an edge profile and for calculation of a best fit line for the edge and for calculation of the overall width of a single wallboard in a multiple wallboard stack since the distance between the two lasers is known and as is discussed in connection with the flowchart of FIG. 3A.

It has been found that methods according to this disclosure in which a post-kiln stack of at least two wallboards or more is analyzed for width and edge profile specification compliance, based on the target wallboard as discussed above, provide accurate and rapid measurements for the whole stack. It has been also found that displaying the edge profiles in real time when such profiles are generated during the scan, simplify a monitoring task for an operator.

Figure 4:
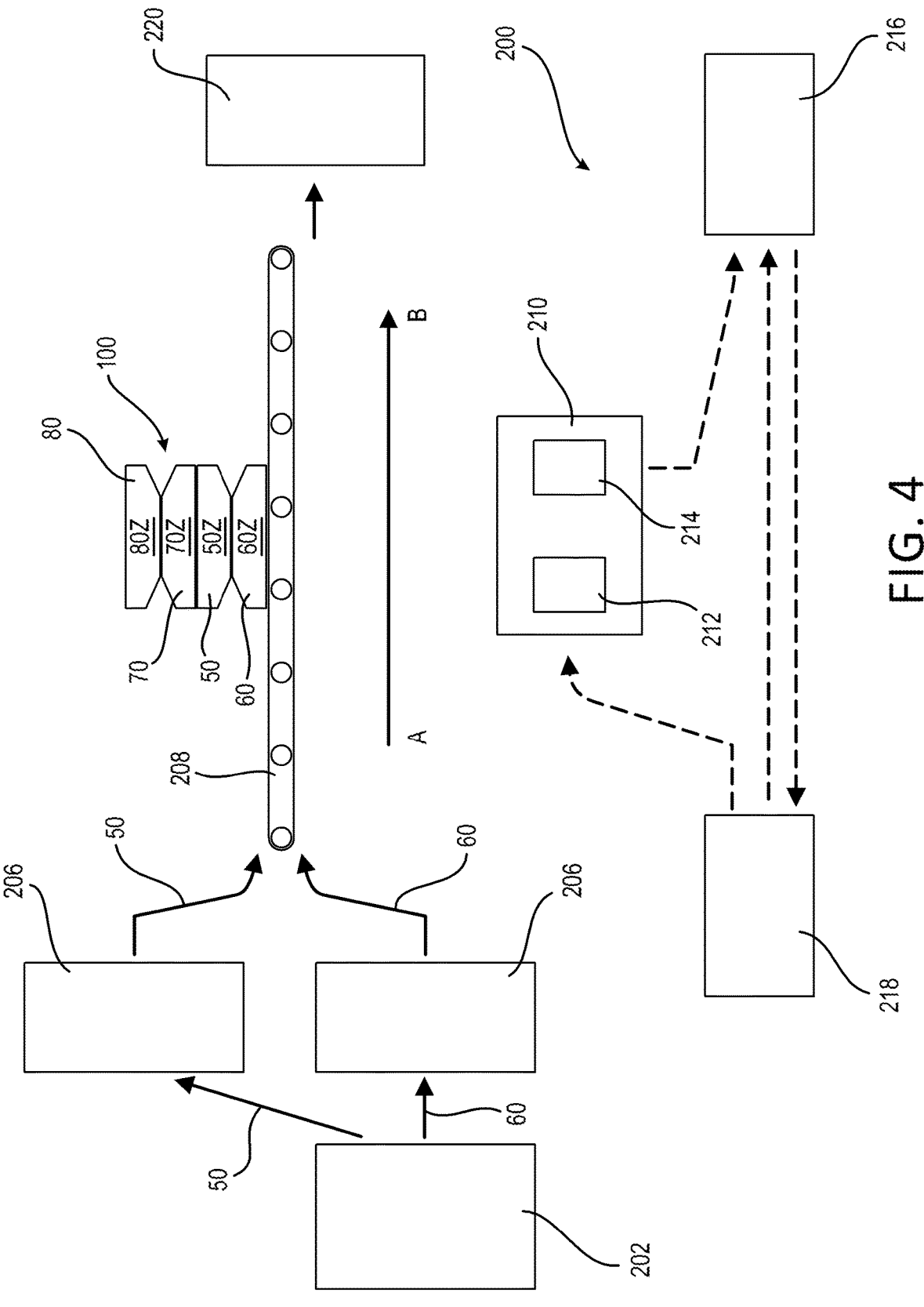
FIG. 4 is a fragmentary schematic side view of a system for manufacturing wallboards, depicting one embodiment for positioning a laser scanner relative to a post-kiln conveyor. The illustration is not drawn to scale.

In yet another aspect, this disclosure relates to a system for manufacturing wallboard, including the wallboard (10 or 50). With a reference to FIG. 4, one embodiment of the system, generally (200), includes a production line (202) on which wallboards are formed from a gypsum slurry deposited on a facer cover sheet and covered with a backer cover sheet, a one or more kilns (206), each kiln (206) having one or more shelves for drying the wallboards (50 and 60); a post-kiln conveyor (208) which receives the wallboards (50, 60, 70 and 80) from one or more kilns (206) and/or from one or more shelves and wherein the post-kiln wallboards are arranged into a stack of at least two wallboards or more, e.g. 3, 4, 5 or 6 in some embodiments, two 2D laser scanners (210) positioned at a distance from the post-kiln conveyor (208) such that a first 2D laser (210) can scan at least a portion of the cross-machine surface of the stack (100), including a first machine-direction edge of the stack, and a second 2D laser (210) positioned at a distance from the post-kiln conveyor (208) such that a second 2D laser (not shown in the drawing) can scan at least a portion of the cross-machine surface of the stack (100), including a second machine-direction (the opposite to the first) edge of the stack (100); a controller (212), a processor (216) and a taping station (220).

The production line (202) includes a mixer for mixing a gypsum slurry, the mixer being disposed over a moving conveyor onto which a facer cover sheet is deposited from a roll. The gypsum slurry is then deposited onto a moving facer cover sheet and covered with a backer cover sheet deposited over the gypsum slurry from a second roll. The formation continues moving on a conveyor to a forming station pressing the formation into a continuous ribbon precursor of a wallboard, which is then moved to a knife station at which the ribbon is cut into wallboards which are then transferred from the production line to a kiln (206) wherein the wallboards are dried at an elevated temperature. Wallboard manufacturing methods and production line embodiments are known from for example, U.S. Pat. Nos. 6,494,609, 6,874,930, and 6,986,812, the entire disclosures of which are herein incorporated by reference.

After this drying process is completed, wallboards are transferred from kiln (206) to a post-kiln conveyor (208). During this transfer, the post-kiln wallboards are arranged into stacks of two wallboards or more.

The 2D laser scanner (210) comprises a laser light source (212) that generates a laser beam and a sensor (214) which is, when the system (200) is in use, is in operable arrangement with the processor (216). When in use, the laser light source (212) scans a surface with a laser beam, while the sensor (220) detects light reflected from the surface and generates an array of distance measurements, each measurement having a horizontal coordinate, x, and a vertical coordinate, y. In the system (200), the first 2D laser (210) and the second 2D laser (210) are positioned at a distance from the post-kiln conveyor (208) such that when a stack of wallboards (100) is transported on the conveyor (208) in the direction from A to B, a cross-machine surface of the stack, including the cross-machine surface (50F) of the target wallboard (50) is in view of the laser light source (212) in order for the light source (212) to scan the cross-machine surface of the stack (100) with a laser beam.

When the system (200) is in use, the 2D laser scanner (210) is in operable arrangement with a processor (216) such that the sensor (214) can transmit arrays of distance measurements to the processor (216) which is in operable arrangement with a non-transitory, computer-readable medium bearing a program for analyzing a data array of distance measurements transmitted to the processor (216) from the sensor (214).

The 2D laser scanner (210) is in operable arrangement with a controller (218). The 2D laser scanner (210) may be configured to operate and perform a laser scan in response to receiving a command signal from the controller (218) which can be configured to determine time intervals at which laser scans are performed. The controller (218) may include one or more a user interface and/or input devices, such as for example, as a keyboard and/or a display screen, which may be adapted to receive input signals from a user. In some embodiments, the controller (218) may be in the form of a desktop computer, laptop computer, computer tablet or a smart phone.

The processor (216) may be configured to send input signals to the controller (218) as well as to receive input signals from the controller (218). The processor (216) is in operable arrangement with the 2D laser scanner (210) in order to receive data arrays of distance measurements from the sensor (214). The processor (216) can comprise any suitable computing device, e.g., a microprocessor, a portable computing device. It may also include one or more input/out devices, e.g., a keyboard and/or a display. The processor may have one or more memory devices, e.g., RAM (Random Access Memory).

Preferably, the processor (216) is configured to execute a program stored in a non-transitory computer readable medium, e.g., a hard drive, the program configured to analyze an array of distance measurements and identify a subset of distance measurements coordinates for a target wallboard in the stack according to embodiments of this disclosure, and then use the subset for generating an edge profile of the target wallboard and calculating a width of the target wallboard. The program may include a graphic user interface that can be displayed on a display device, including inputs by a user and outputs generated by the program, including an edge profile image. In embodiments, the program may be configured to analyze arrays of distance measurements and find coordinates for bottom and top vertexes of the target wallboard and perform embodiments of the methods (300) and (400).

In the system (200), a taping station (220) is positioned to receive wallboard stacks (100) from the post-kiln conveyor (208). At the taping station (220), cross-machine edges may be taped with a tape and the stacks (100) are packaged for shipment to a user.

The system (200) may further include various additional components and stations that are commonly used in manufacturing of wallboards or for their packaging. For example, the system may include one or more laser scanners positioned at the production line (210) for monitoring formation of a gypsum ribbon, for example as described in U.S. Pat. No. 9,745,222.

In yet another embodiment, this disclosure relates to methods for manufacturing a wallboard. Embodiments of the methods may be performed using the system (200). Various methods for manufacturing wallboards on a production line are well known in the art, including as described in U.S. Pat. Nos. 9,745,222 and 10,620,052, the entire disclosure if which is herein incorporated by reference.

The methods according to this disclosure may comprise: mixing a gypsum slurry from calcined gypsum, water and one or more additives; depositing the gypsum slurry on a facer paper cover sheet continuously moving on a production line; covering the gypsum slurry with a backer paper cover sheet; forming a ribbon precursor of wallboard; cutting the ribbon into wallboards; transferring the wallboards to a kiln; drying the wallboards in the kiln; and wherein the methods are further characterized by: while removing the wallboards from the kiln, the method comprise arranging the wallboards into stacks of two wallboards or more on a post-kiln conveyor; and moving the stacks on the post-kiln conveyor pass a location at which each stack is scanned with a 2D laser on its cross-machine surface and a first array of distance measurements for a first machine-direction edge of the stack is generated and a second array of distance measurements for a second machine direction edge is generated.

One of the technical advantages of the manufacturing methods according to this disclosure is that they further include analyzing the first array and the second array for compliance with specification requirements for a finished product and wherein the analysis includes transmitting the arrays to a processor which executes a computer program which selects a target wallboard in the stack and computes a width and edge profile for the target wallboard.

Embodiments include those, wherein the selecting the target wallboard includes finding in the arrays a horizontal coordinate and a vertical coordinate for each of the two bottom vertexes and for each of the two top vertexes of the target wallboard. Preferably, the finding of the bottom vertexes may be performed by using the decreasing distance measurements and wherein finding of the top vertexes is performed by using the increasing distance measurements. In further embodiments, the methods may comprise: calculating a width value of the target wallboard and classifying the stack as width-value compliant if the width value of the target wallboard is withing a width tolerance range, or as width-value non-compliant if the width value of the target wallboard is not within the width tolerance range; and moving the stack to a taping station if the stack is classified as width-value compliant or moving the stack for recycling if the stack is not width-value compliant.

What is claimed is:

1. A system for manufacturing a wallboard, the system comprising:

a wallboard manufacturing line, one or more kilns configured for receiving wallboards from the wallboard manufacturing line, a post-kiln conveyor configured for receiving from the one or more kilns a stack of two or more wallboards, wherein a first wallboard and a second wallboard are aligned in the stack with a front long surface of the second wallboard covering a front long surface of the first wallboard, and wherein the second wallboard in the stack is a target wallboard, and wherein the post-kiln conveyor being configured for moving the stack with a cross-machine surface of the stack moving along the length of the post-kiln conveyor, and one or more 2D laser scanners configured to detect a gap between the first wallboard and the second wallboard positioned at a location which is at a distance from the post-kiln conveyor, the one or more 2D laser scanners having a view from the location of a cross-machine surface of the stack situated at a place along the length of the post-kiln conveyor; and wherein the one or more 2D laser scanners are in operable arrangement with a processor in operable arrangement with a non-transitory, computer-readable medium that stores a computer program which when executed by the processor, selects the target wallboard from the stack for calculations and computes a width and edge profile of the target wallboard in the stack.

2. The system of claim 1, wherein the system further comprises a taping station configured for receiving the stack from the post-kiln conveyor.

3. The system of claim 1, wherein the system further includes a controller in operable arrangement with the one or more 2D laser scanners.

4. The system of claim 1, wherein the one or more kilns, each has several shelves, each shelf configured for housing one or more wallboards.

5. The system of claim 1, wherein the computer program locates the target wallboard in the stack by detecting a gap between tapered edge portions of the first wallboard and the second wallboard.

6. A method for manufacturing a wallboard with the system of claim 1, the method comprising:

mixing a gypsum slurry from calcined gypsum, water and one or more additives;

depositing the gypsum slurry on a facer paper cover sheet continuously moving on the wallboard manufacturing line;

covering the gypsum slurry with a backer paper cover sheet;

forming a ribbon precursor of wallboard;

cutting the ribbon into wallboards;

transferring the wallboards to the one or more kilns;

drying the wallboards in the one or more kilns;

while removing the wallboards from the one or more kilns, arranging the wallboards into a stack of two wallboards or more on the post-kiln conveyor; and moving the stack on the post-kiln conveyor pass a location wherein the one or more 2D laser scanners are located; scanning the stack with the one or more 2D laser scanners on its cross-machine surface; and selecting the target wallboard from the stack by executing the computer program which locates the target wallboard in the stack by detecting the gap and computes the width and edge profile of the target wallboard in the stack.

7. The method of claim 6, wherein the stack contains 2, 3, 4, 5, or 6 wallboards.

* * * * *